United States Patent [19]
Healy et al.

[11] Patent Number: 5,229,746
[45] Date of Patent: Jul. 20, 1993

[54] VEHICLE WIND SCREEN LIGHT ASSEMBLY

[75] Inventors: Morris G. Healy, Chesterfield; Steven M. Healy, Worthington, both of Mass.; Richard I. Bartlett, Moatsville, W. Va.

[73] Assignee: Healy Transporation Inc., Worthington, Mass.

[21] Appl. No.: 688,237

[22] Filed: Apr. 22, 1991

[51] Int. Cl.⁵ .............................................. B60Q 1/00
[52] U.S. Cl. ........................... 340/459; 340/461; 340/457; 340/457.2; 340/475; 340/458; 362/80.1
[58] Field of Search ............ 340/458, 459, 461, 457.2, 340/457, 475, 815.06; 362/80, 80.1

[56] References Cited

U.S. PATENT DOCUMENTS

| 2,403,123 | 7/1946 | Roper | 340/458 |
| 3,110,882 | 11/1963 | Stuerzl et al. | 340/461 |
| 3,233,217 | 2/1966 | Bost, Jr. | 340/901 |
| 3,317,906 | 5/1967 | Baldridge | 340/461 X |
| 4,101,870 | 7/1978 | Ekman | 340/459 |
| 4,320,906 | 3/1982 | Saunders, IV | 362/80.1 X |
| 4,488,141 | 12/1984 | Ohlenforst et al. | 362/80.1 |
| 4,996,442 | 2/1991 | Wayne | 340/459 X |

FOREIGN PATENT DOCUMENTS 0017718 2/1981 Japan .................................. 340/461

Primary Examiner—Jin F. Ng
Assistant Examiner—Christine K. Oda
Attorney, Agent, or Firm—Howard Paul Terry

[57] ABSTRACT

A vehicle wind screen light assembly for use on a vehicle disposed in the field of view of the driver. This assembly includes, an auxiliary support member, such as a wind screen or bug deflector, mounted on the vehicle. A plurality of light signal units are supported by the auxiliary support member in a spaced apart arrangement in the field of view of a driver. A wiring subassembly connects the light signal units to respective light signal circuits.

4 Claims, 3 Drawing Sheets

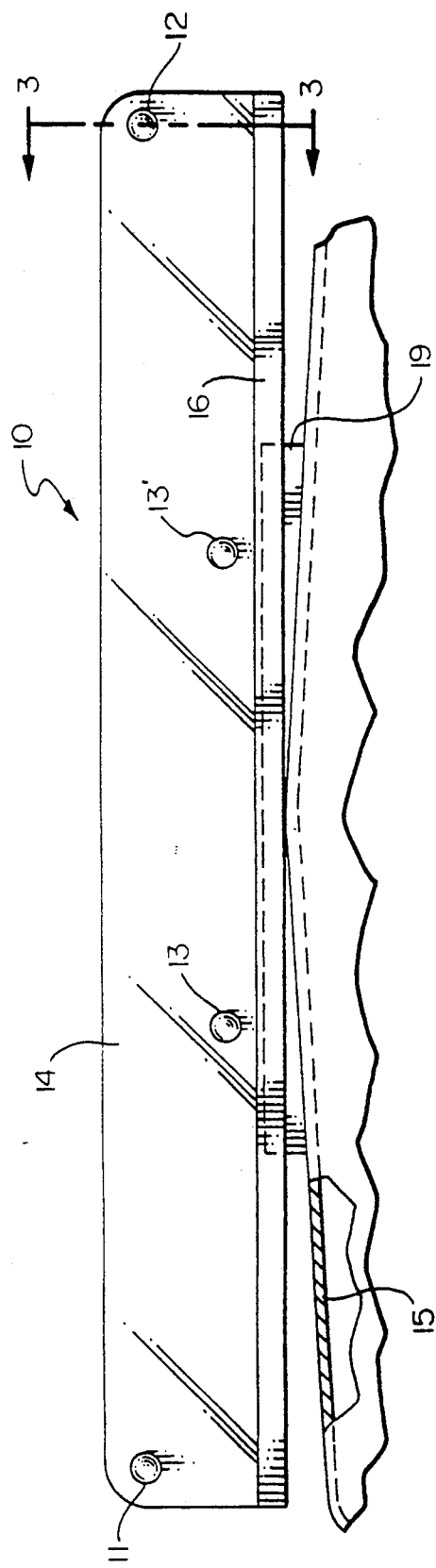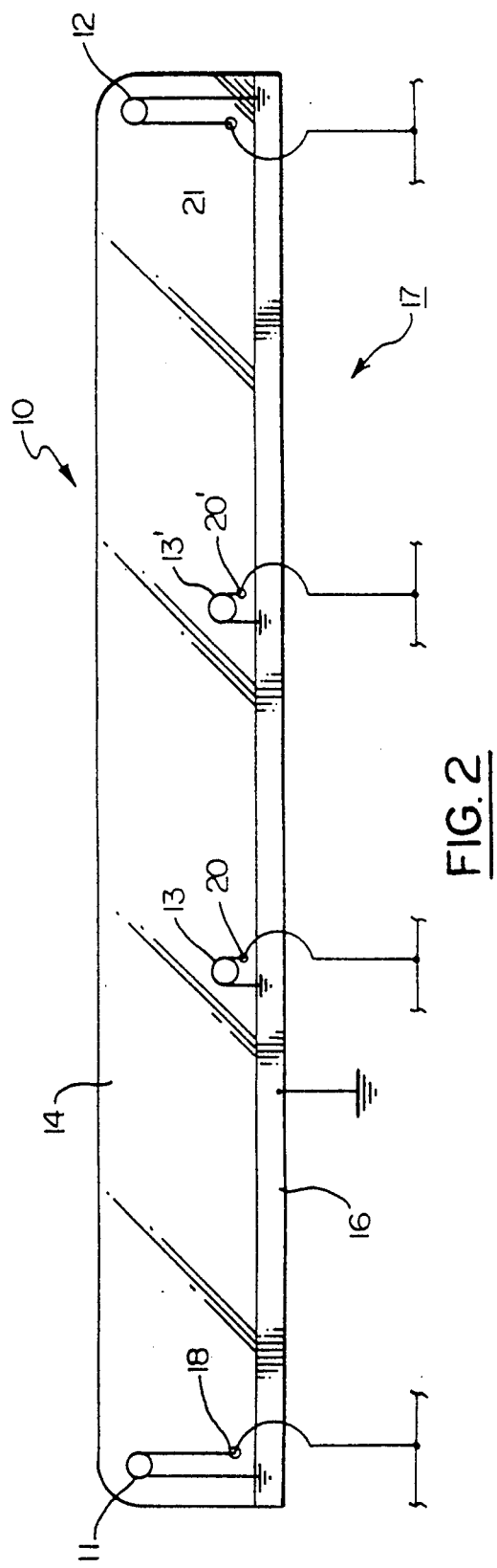

VEHICLE WIND SCREEN LIGHT ASSEMBLY

The invention generally relates to a vehicle wind screen monitoring light assembly, and in particular the invention relates to a vehicle light assembly mounted on an auxiliary support member that in turn is secured to the vehicle generally in the driver's field of vision, for example, a front of hood mounted wind screen or bug deflector or comparable device.

BACKGROUND OF INVENTION

The prior art vehicle light assembly has left and right directional signal lights, a high beam signal light and a lights-on signal light mounted on the vehicle dashboard.

One problem with the prior art vehicle light assembly and arrangement is that an extra time interval is added to a driver's response time for locating and then making a change or a correction to one of such signal lights. This is especially true if the cancelling mechanism does not function properly thereby leaving directional signals on, or if a turn is not sharp enough to allow for the cancelling mechanism to function at completion of a turn when the steering wheel returns to a straight ahead mode.

SUMMARY OF THE INVENTION

According to the present invention, a vehicle monitoring light assembly is provided within the driver's field of vision. In one embodiment, this assembly may comprise a transparent wind screen for mounting on a vehicle hood near to the front of the hood, a left directional signal light means, a right directional signal light means, a high beam signal light means, and a lights-on signal light means mounted on the wind screen in a spaced apart arrangement, and a wiring subassembly for connecting each of the lights to its respective circuit.

It will be recognized that additional indicators may be utilized as described.

By using the vehicle wind screen monitoring light assembly, the extra time interval added to a driver's response time for initially locating and then making a change or correction to one of its signal lights is minimized, because of eliminating the need to alter the eye focus from the few inches to the dash-board indicator and then back to the considerable distance ahead of the vehicle for acceptable control. The monitoring lights mounted on the bug deflector, wind screen or comparable device at the front of the vehicle are already in the operator's field of vision and thus no adjustment of the eye focus is necessary.

The foregoing and other objects, features and advantages will be apparent from the following description of the preferred embodiment of the invention as illustrated in the accompanying drawings.

BRIEF DESCRIPTION OF THE DRAWINGS

FIG. 1 is an elevation view of a vehicle light assembly according to the invention;

FIG. 2 is an elevation view corresponding to FIG. 1;

DESCRIPTION OF THE PREFERRED EMBODIMENT

Figure 3:
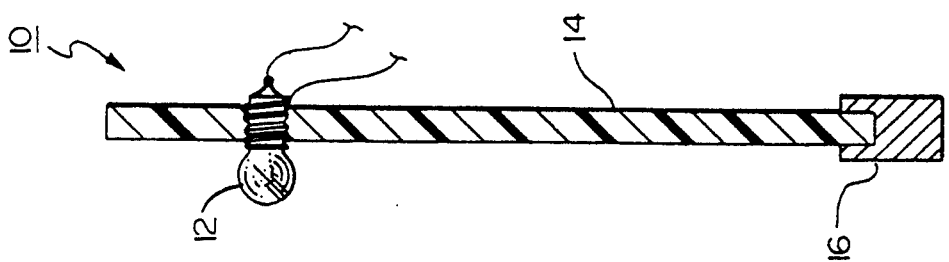
FIG. 3 is a section view as taken along line 3—3 of FIG. 1.

As shown in FIGS. 1, 2 and 3, a vehicle light assembly 10 is provided. Assembly 10 includes a left directional signal light bulb 11, a right directional signal light bulb 12, a high beam indicator signal light bulb 13, and a lights-on signal light bulb 13'. FIG. 1 is approximately the view as seen by a driver, when looking from the driver's seat. Assembly 10 also includes a wind screen or bug deflector shield 14, which is composed of transparent plastic material. Shield 14 is located relatively near to the vehicle's headlights. Shield 14 is mounted on a vehicle hood 15. Assembly 10 also has a strip or bar 16, which supports shield 14, and which is composed of a metal material. Assembly 10 also has a wiring subassembly 17. Hood 15 has a mounting plate 19, or the like, for supporting strip 16. Bulb 12 is mounted on the leeward side of shield 14, but it can be turned 180 degrees, if desired. Shield 14 has a threaded hole to receive bulb 12. Front and rear plastic snap-on washers can be used to attach bulb 12 to shield 14 in an alternate arrangement. Leads or connectors are respectively soldered at their ends to the bulb shank and bulb tip. Bulb 12, which is typical, is identical in construction to bulb 11 and bulbs 13 and 13'.

As shown in FIG. 2, wiring subassembly 17 includes a power source terminal 18, which connects to bulb 11, and which connects to a left directional signal circuit (not shown). Wiring subassembly 17 also has a power source terminal 20, which connects to bulb 13, and which connects to a high beam circuit (not shown). Wiring subassembly 17 also has a power source terminal 20', which connects to bulb 13', and which connects to a lights-on circuit (not shown). Wiring subassembly 17 also has a power source terminal 21, which connects to bulb 12, and which connects to a right directional signal circuit (not shown). Strip 16 connects to a ground or vehicle body portion.

As shown in FIG. 2, leads or wires are provided. A wire extends from bulb 11 to strip 16. A wire also extends from bulb 11 to terminal 18. Another wire extends from terminal 18 to a left directional signal circuit. A wire extends from bulb 13 to strip 16. A wire also extends from bulb 13 to terminal 20. Another wire extends from terminal 20 to a high beam circuit. A wire extends from bulb 13' to strip 16. A wire also extends from bulb 13' to terminal 20'. Another wire extends from terminal 20' to a lights-on circuit. A wire extends from bulb 12 to strip 16. A wire also extends from bulb 12 to terminal 21. Another wire extends from terminal 21 to a right directional signal circuit.

Figure 5:
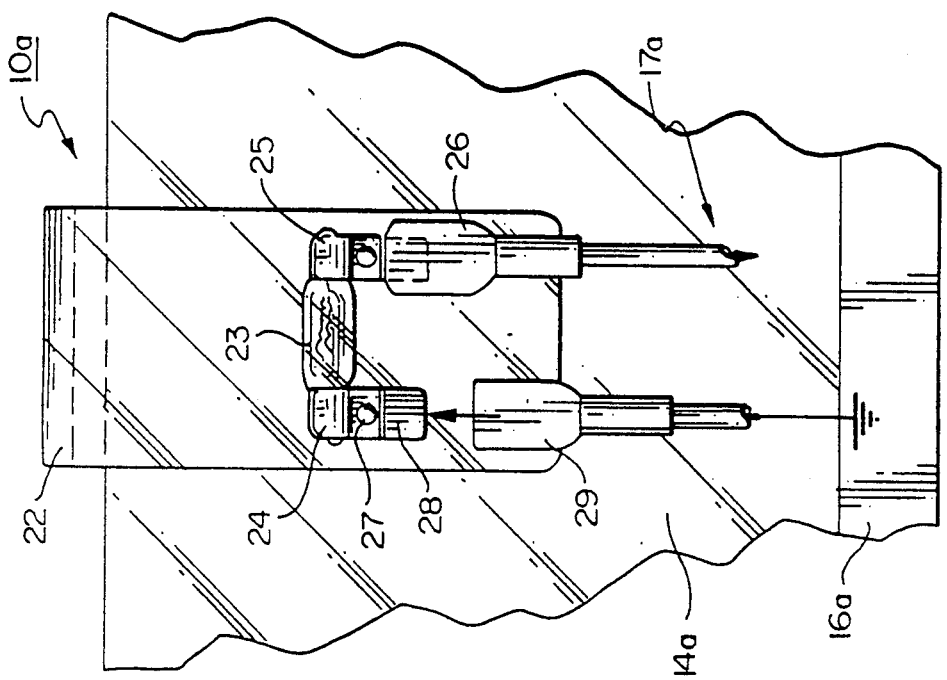
FIG. 5 is an elevation view as taken along line 5—5 of FIG. 4.
Figure 4:
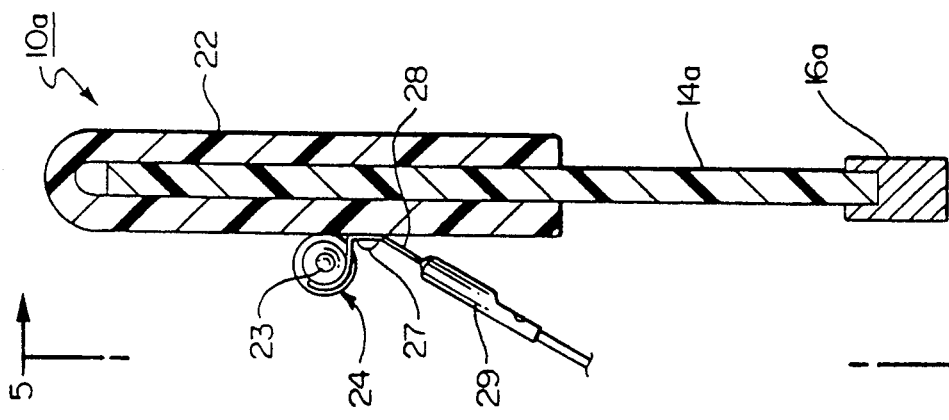
FIG. 4 is a section view corresponding to FIG. 3 of a second embodiment of the invention.

As shown in FIGS. 4 and 5, a second embodiment or assembly 10 is provided. Parts of second embodiment 10a which are similar to corresponding parts of first embodiment 10 have the same numeral, but with a subscript "a" added thereto. Assembly 10a has a bulb 23, a shield 14a, a strip 16a, and a wiring subassembly 17a. Bulb 23 has a U-shaped clip 22, which is composed of a transparent plastic material. Bulb 23 has bent plates or bulb holders 24 and 25. Bent plate 24, which is identical to bent plate 25 has a rivet 27, which attaches plate 25 to clip 22. Bent plate 24 also has a connector portion or end portion 28. Wiring subassembly 17a has a recessed wire end portion 29. Bulb 23, which is typical, is identical in construction to a left directional signal bulb (not shown) and a high beam signal bulb (not shown). Wire end portion 29 connects to a right directional signal circuit (not shown) and connects to portion 28 of plate 24. A ground wire end portion 26 connects to a similar portion of plate 25.

Figure 7:
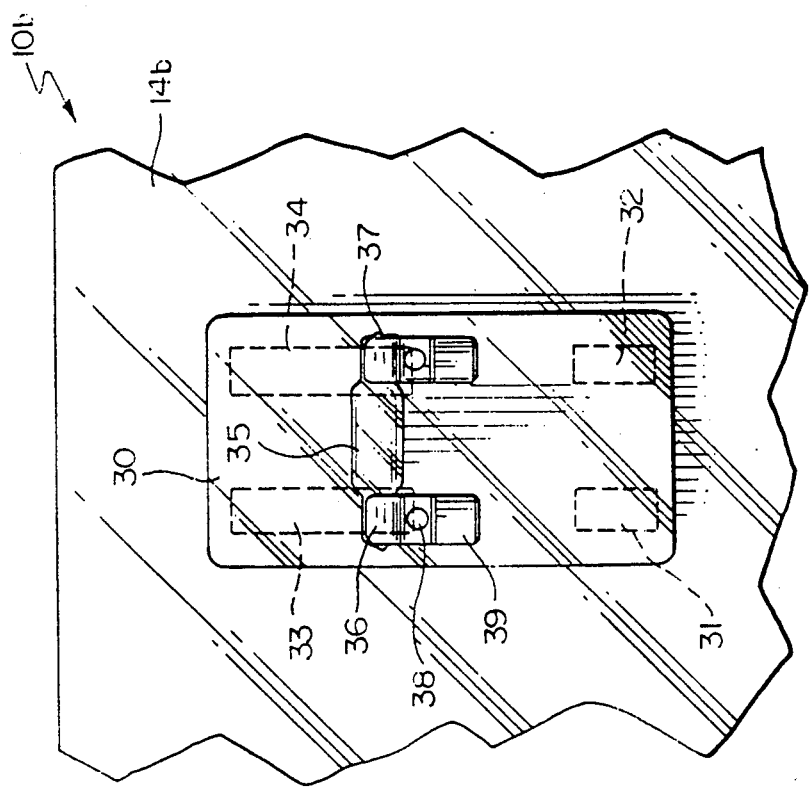
FIG. 7 is an elevation view as taken along line 7—7 of FIG. 6.
Figure 6:
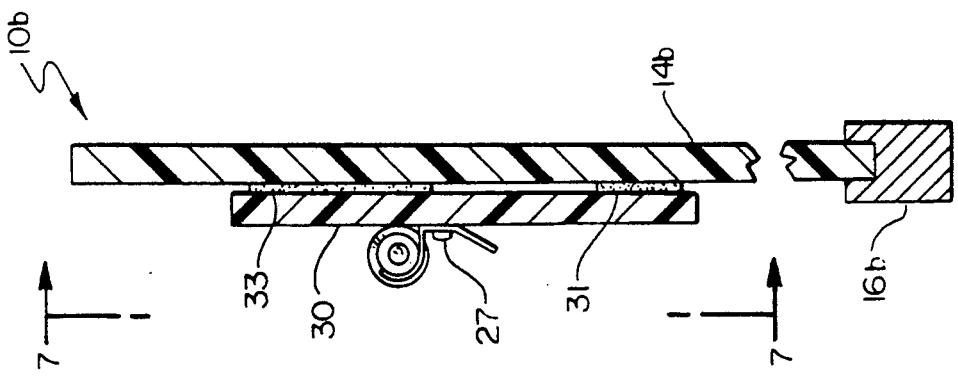
FIG. 6 is a section view corresponding to FIG. 4 of a third embodiment of the invention.

As shown in FIGS. 6 and 7, a third embodiment or assembly 10b is provided. Parts of third embodiment 10b which are similar to corresponding parts of first embodiment 10 have the same numerals, but with a subscript "b" added thereto. Assembly 10b has a block 30, which has four adhesive portions 31, 32, 33, 34, that support block 30. Assembly 10b also has a bulb 35, a shield 14b, and a strip 16b. Adhesive portions 31, 32, 33, 34 are attached to shield 14b. Block 30 is composed of a transparent plastic material. Bulb 35 has bent plates or bulb holders 36, 37. Bent plate 36, which is identical to bent plate 37, has a rivet 38, which attaches plate 36 to block 30. Bent plate 36 also has a connector portion or end portion 39 for connection to a wire recessed end portion (not shown). Bulb 35 and its block 30 are typical. Bulb 35, which is the right directional signal bulb, is identical in construction to a left directional signal bulb (not shown) and a high beam signal bulb (not shown). Assembly 10b has a wiring assembly (not shown) which is the same as that of assembly 10a.

The advantage of each of the assemblies 10, 10a and 10b that the lights, such as lights 11, 12, 13, and 13' of assembly 10, are in the field of vision of the driver of the vehicle, whereby the driver response time for changing signals is minimized. Another advantage is the improved illumination of the vehicle signals for easier viewing by on-coming drivers.

While the invention has been described in its preferred embodiment, it is to be understood that the words which have been used are words of description rather than limitation and that changes may be made within the purview of the appended claims without departing from the true scope and spirit of the invention in its broader aspects.

For example, bulbs 11, 12, 13 can be cast in a mold, together with its shield 14. As another example, each of the bulbs, such as bulb 23 in assembly 10a, can be cast in a mold together with its clip 22. In both examples, the bulbs can protrude from, or be flush with, the near and far surfaces, of the shield 14 in FIGS. 1, 2 and 3, or the clip 22 in FIGS. 4 and 5, or of the block 30 in FIGS. 6 and 7. With these examples, wires can also be disposed within the molded member. Also, connector portions can protrude from the molded member and be located, as desired.

The embodiments of an invention is which an exclusive property or right is claimed are defined as follows:

1. A vehicle light assembly comprising:
   an auxiliary support member for mounting on a vehicle hood;
   a plurality of light signal means supported by the auxiliary support member in spaced apart arrangement within the driver's field of view; and
   a wiring subassembly for connecting each of the light signal means to a respective light signal circuit, in which the auxiliary support member is a transparent wind screen for mounting on the vehicle hood, wherein each of the light signal means includes:
   a light bulb threaded into a portion of the wind screen.

2. A vehicle light assembly comprising:
   an auxiliary support member for mounting on a vehicle hood;
   a plurality of light signal means supported by the auxiliary support member in spaced apart arrangement within the driver's field of view; and
   a wiring subassembly for connecting each of the light signal means to a respective light signal circuit, in which the auxiliary support member is a transparent wind screen for mounting on the vehicle hood, wherein
   each of the light signal means includes:
   a light bulb having metal shanks at each end thereof;
   a pair of bent plates respectively holding the metal shanks and having respective connector portions connecting to the wiring subassembly; and
   a bulb support member supported by the wind screen.

3. The assembly of claim 2, wherein the bulb support member is a U-shaped transparent clip member clipped onto the wind screen.

4. The assembly of claim 2, wherein the bulb support member is a transparent block having adhesive means attached to the wind screen.

* * * * *